(12) United States Patent
Denisart et al.

(10) Patent No.: US 7,930,972 B2
(45) Date of Patent: Apr. 26, 2011

(54) METHOD OF IMPROVING THE PRODUCTION OF FOAM DURING THE PREPARATION OF DRINKS FROM A CARTRIDGE AND DEVICE FOR ITS IMPLEMENTATION

(75) Inventors: Jean-Luc Denisart, Cully (CH); Jean-Paul Denisart, La Conversion (CH); Zenon Ioannis Mandralis, Chexbres (CH)

(73) Assignee: Nestec S.A., Vevey (CH)

( * ) Notice: Subject to any disclaimer, the term of this patent is extended or adjusted under 35 U.S.C. 154(b) by 1142 days.

(21) Appl. No.: 11/570,291

(22) PCT Filed: Jun. 9, 2005

(86) PCT No.: PCT/EP2005/006196
§ 371 (c)(1), (2), (4) Date: Dec. 8, 2006

(87) PCT Pub. No.: WO2006/002741
PCT Pub. Date: Jan. 12, 2006

(65) Prior Publication Data
US 2007/0248734 A1   Oct. 25, 2007

(30) Foreign Application Priority Data
Jun. 25, 2004   (EP) .................................... 04015038

(51) Int. Cl.
*A47J 31/00* (2006.01)
(52) U.S. Cl. ......................... 99/295; 99/302 R; 99/323.1
(58) Field of Classification Search ..................... 99/295, 99/302 R, 293, 323.1
See application file for complete search history.

(56) References Cited

U.S. PATENT DOCUMENTS

| | | | |
|---|---|---|---|
| 3,478,670 A * | 11/1969 | Fuqua ............................. | 99/283 |
| 4,581,239 A | 4/1986 | Seward et al. | |
| 4,806,375 A | 2/1989 | Favre | |
| 5,242,702 A | 9/1993 | Fond | |
| 5,937,738 A * | 8/1999 | Okamura et al. ........... | 99/302 R |
| 6,142,063 A * | 11/2000 | Beaulieu et al. ................ | 99/283 |
| 7,398,726 B2 * | 7/2008 | Streeter et al. .................. | 99/305 |
| 2002/0129712 A1 | 9/2002 | Westbrook et al. | |
| 2005/0150391 A1 * | 7/2005 | Schifferle ....................... | 99/295 |

FOREIGN PATENT DOCUMENTS

| | | |
|---|---|---|
| EP | 0051247 | 5/1982 |
| EP | 0250810 | 1/1988 |
| EP | 0468080 | 1/1992 |
| EP | 0512142 | 11/1992 |

(Continued)

*Primary Examiner* — Reginald L Alexander
(74) *Attorney, Agent, or Firm* — K&L Gates LLP (57) ABSTRACT

Apparatus and method of obtaining a frothy drink from a cartridge, the cartridge being made up of at least one chamber containing at least a preparation for a drink. Where the cartridge is injected with a predetermined volume of fluid, a first part of which essentially consists of air which is compressed in the cartridge to a pressure lower than the pressure at which the cartridge opens or the drink flows freely through the cartridge and a second part of which consists of water, or possibly of a mixture of air and water, which is injected after the first part into the cartridge so as to make it possible to obtain the drink by causing the internal pressure to increase until the cartridge opens or the drink flows freely through the cartridge thus allowing the drink to be discharged and froth to be formed.

8 Claims, 4 Drawing Sheets

FOREIGN PATENT DOCUMENTS

| | | |
|---|---|---|
| EP | 0652721 | 5/1995 |
| GB | 2363343 | 12/2001 |
| WO | WO 015786 | 3/2000 |
| WO | WO0154551 | 8/2001 |
| WO | WO03059778 | 7/2003 |
| WO | WO2004006742 | 1/2004 |

* cited by examiner

METHOD OF IMPROVING THE PRODUCTION OF FOAM DURING THE PREPARATION OF DRINKS FROM A CARTRIDGE AND DEVICE FOR ITS IMPLEMENTATION

The invention relates to a method of obtaining a frothy drink from a portion pack and to the device for the implementation of the said method.

BACKGROUND

It is known practice for drinks to be prepared from portion packs containing food ingredients such as a ground preparation to be extracted, a powder to be dissolved or some other partially or fully soluble agglomerate. These ingredients are generally contained in special packs such as cartridges which are inserted into a device comprising a water supply, a pump capable of delivering pressure and an injection member for introducing water into the cartridge. The drink is obtained by flowing through at least one wall after the fluid pressure has increased sufficiently within the cartridge. In general, the wall is porous by nature or by tearing upon contact with piercing or tearing elements when a predetermined fluid pressure is reached inside the cartridge. The drink obtained then flows out into the container intended for consumption.

In the case of numerous hot or cold drinks, the presence of froth (or foam) is a quality that is much sought-after for reasons both of taste and of appearance. The froth is usually a dispersed liquid-gas, generally liquid-air, system which entails the presence of a fatty substance, generally provided by the food substance, and of a physical method of agitation making it possible to form the dispersed system then known as "froth".

Certain publications relate to the production of a froth by supplying air and/or steam. However, the air is supplied at atmospheric pressure or at low pressure or alternatively is residual air; this generally detracts from the quality and quantity of froth.

For example, patent application DE 10247573 describes the increase in the amount of froth for filter coffees using an orifice positioned between the filter and the coffee storage container which sucks in ambient air because of the depression brought about by the flow.

U.S. Pat. No. 4,581,239 describes a method of infusion using sachets with successive injections of hot water interspersed with stirrings and possible contact with a gas or steam. The introduction of a gas is done at atmospheric pressure or under the pressure of a gas pump so as merely to control the time of contact between the water and the product being infused.

Patent EP 0 652 721 B1 describes a method in which a needle pierces a flexible sachet in order to inject a mixture of air and water into it, the pressure increases and the sachet tears. The air in this mixture is, in fact, residual air contained in the pipes which mixes with the water when the extraction process begins.

Patent application GB 2 363 343 describes a method for producing froth on demand from a system of the venture type. The method consists in injecting the air in a reservoir onto a liquid with a high protein content, such as milk, causing froth to form.

Injection continues after the froth has formed so as to expel it from the reservoir. The said froth is then discharged on demand via a pipe separate from the one used to obtain the drink.

Patent application US 2002/0129712 describes a method for obtaining a creamy coffee. In this method, a device makes it possible to increase the amount of froth, and does so by injecting hot water or water vapor during the purge. This method makes it possible to obtain hot drinks and requires an injection of fluid at a temperature of between 150 and 210° F.

Patent application WO 0158786 relates to a cartridge containing a compartment containing an ingredient for extracting a drink and a passage for the outflow of the drink which comprises an air inlet and means for generating a reduction in pressure of the jet of the drink. The pressures used for extraction in the compartment are of the order of 0.7 to 2 bar. This system provides a quantity of air and makes it possible to produce froth in a special arrangement of the outflow outlet. However, this system uses the depression created by the outflow of the drink through the cartridge and so the volume of air incorporated is limited. In addition, the air is provided at relatively low pressures and so the bubbles formed are large in size and the froth formed is therefore not very stable and lacks finesse. Finally, such a system makes the cartridge more complicated and expensive to produce.

Certain publications also describe the supply of air to the portion pack for purposes other than that of improving the frothing or alternatively for no particular reason. In particular, patent application EP 0 250 810 A1 describes a method of extracting closed cartridges containing roasted coffee for the preparation of drinks, in which the cartridge is prewetted with water (at a pressure of about 2 to 3 kg/cm2). Next, air is injected to aerate the bed of coffee; the air then taking up the volume and forcing the prewetting water to occupy a maximum of volume. Finally, water is injected up to a pressure of between 35 3 and 6 kg/cm2 to finish the wetting. After these three steps, water is reinjected in order to increase the pressure and pierce the cartridge, the pressure is then of the order of 6 to 16 kg/cm2. All these steps are aimed at allowing better wetting and better aeration of the coffee with a view to optimizing its flavors in the context of ground roasted coffee.

Patents EP 051247, EP 0512142 and EP 468080 describe methods in which a mixture of water and air is injected into a cartridge. The air is also residual air contained only in the pipes.

These patents or patent applications describe methods of obtaining generally hot drinks by filtration, dissolution or extraction of a food substance.

However, there is a need to improve the control of the production and quality of the froth when preparing a hot or cold drink obtained from cartridges.

This is because producing froth for drinks from cartridges is difficult, especially if the said drinks are cold or at ambient temperature, because the supply of energy needed to form the dispersed system must then be greater because of the lesser extent to which a Brownian motion is encouraged.

The volume of air available is also generally not enough to produce a froth in satisfactory quantity and of satisfactory quality.

Another problem is associated with the need to produce drinks of a significant volume and with the insufficiency of air available in the cartridge to produce froth in satisfactory quantity and of satisfactory quality. The problem is that there is a need to produce both large-volume drinks, particularly in the case of certain hot or cold milk-based specialties, while using cartridge sizes of a reasonable size. Now, some of the ingredients involved in the composition of the drinks occupy a great deal of volume in the cartridge, such as the milk powder, for example, leaving little or no headspace and therefore little gas volume available for use in frothing. In order to obtain froth, the cartridge then has to be of a larger size so that the volume of gas needed to create froth can be reserved, but this poses problems in managing cartridge sizes, in adapting the machines to suit different sizes, in the cost of the packaging materials, and raises other problems still.

In addition, by supplying air at low pressure or atmospheric pressure, the froth has a "soapy" configuration with most of the bubbles excessively large in size, which produces a foam that lacks stability. If the space available in the cartridge is small, the supply of air is then not sufficient to produce froth. In order to make froth, it is then necessary to employ mechanical stirring systems, but that makes the device and/or the cartridge far more complicated and the quality of the froth remains mediocre.

SUMMARY

One of the objects of the present invention is therefore to obtain hot or cold drinks, from cartridges, having an improved level and quality of froth. To do that, the air concentration in the cartridge is increased by adding air of controlled volume to the inside of the cartridge. The fact of increasing the air concentration when preparing the drinks has the effect of increasing the stirring within the cartridge and therefore of obtaining a finer, creamier froth of better stability and in significant quantity.

Another object of the invention is to propose a method making it possible to obtain frothy drinks in a wide range of drinks volumes regardless of the volume that the ingredients occupy within the cartridge. Another object is to propose a method which makes it possible to improve the characteristics of the froth when preparing cold drinks.

Finally, another object is to propose a simplified device without using complicated injection systems and/or cartridges having complicated air inlet and mixing systems in order to produce the froth. The invention therefore relates to a method of obtaining a frothy drink from a cartridge, the said cartridge being made up of at least a chamber containing at least a preparation for a drink, characterized in that: a predetermined volume of fluid is injected into the said cartridge, the injection being done by injecting a phase consisting essentially of air which is compressed to form a reserve pocket of air in the cartridge, compressed to a pressure lower than the pressure at which the cartridge opens or at which the drink flows freely through the said cartridge, and then, by injecting a phase comprising water which mixes with the air in the cartridge; the water phase injected causing an increase in the internal pressure until the cartridge opens or the drink flows freely through the cartridge thus allowing the drink to be discharged and froth to be formed.

The principle of the invention is therefore mainly to create a reserve pocket of air which is compressed in the cartridge before the cartridge allows the drink to flow out in significant quantity and to cause froth by sufficient agitation in the cartridge; the outflow then being regulated by increasing the pressure supplied to the cartridge by the water phase.

As a preference, the supply of air is controlled by a predetermined volume of air which is contained in at least one storage member, which fills with air before each cycle of injection into the cartridge. The predetermined volume of air empties then during each injection cycle by being injected into the cartridge, thereby forming a reserve of compressed air in the cartridge.

As a preference, the predetermined volume of fluid also comprises a volume of water which is injected into the cartridge, acting like a piston so as to drive the volume of air until it is introduced into the cartridge. According to such a configuration, the pressurizing of the air by the water in the cartridge is ensured; this makes it possible to accumulate a larger quantity of air and to keep to small-sized cartridges. The risk of air leaks is also seduced and a system that is relatively simple to implement is retained. Finally, good coordination in the injection of air preceding the injection of the essentially aqueous part is ensured. It should be noted that the phases of injecting air then water may take place in such a way as to overlap in the sense that the air and the water can be injected into the cartridge at the same time. Thus, a certain amount of air can be dissolved in water during the injection of the water phase. Conversely, a certain amount of water may be injected with the air-injection phase or before the injection of air resulting, for example, in the purging of the device of the residual water lying in the pipes before the air arrives. Nonetheless, the principle is to create a reserve pocket of air in the capsule which becomes compressed therein and to supply water thereto which, by stirring, becomes mixed with the air to form the drink, for example to dissolve the preparation, and, in addition, form the froth.

According to an advantageous aspect, the predetermined volume of air is at least 10 centimeters cubed. As a preference, the predetermined volume of air is at least 15 centimeters cubed, more preferably at least 20 centimeters cubed and, more preferably still, at least 23 centimeters cubed. The volumes reserved are far greater than the volumes of residual air contained in the fluid pipes and which is usually eliminated as far as possible. Hence, such intended volumes are able to accumulate a greater amount of pressurized gas in the cartridge; this makes it possible to obtain a greater quantity of froth and bubbles of smaller sizes; hence a froth with a less "soapy" appearance which is therefore more stable.

In an advantageous possible embodiment, the volume of water injected is a non-heated volume allowing cold frothy drinks to be produced. It is thus possible to obtain frothy drinks at temperatures lower than the temperatures usually delivered for such drinks. It is thus offered to propose drinks that are more refreshing but with a level and quality of froth usually reserved for hot drinks alone.

A frothy drink is to be understood as meaning any drink that can be obtained from cartridges, for example soluble and/or ground coffee, cappuccino, soluble tea, instant chocolate, powdered milk, fruit juice, an infusion such as a drink based on aromatic plants, for example verbena, camomile, fennel or the like.

A cartridge is to be understood, for example, as meaning that described in patent application WO 03/059778, the content of which is included here by reference, and/or any pack comprising at least one chamber containing a food composition, intended to be accepted by suitable accepting means of an extraction or dissolution device and comprising means of supplying the cartridge with fluid.

Opening means are to be understood as meaning any means that allow a predetermined pressure to be overcome so as to cause the drink to pass through the said means. For example, this may be a membrane forming part of the cartridge, with a line of weakness which breaks when the pressure within the cartridge exceeds a certain threshold value.

Another example of an opening means may be an assembly composed of a retaining means such as a wall or membrane placed within the cartridge and of roughnesses and/or puncturing elements which, under the action of pressure, above a certain predetermined fluid threshold, collaborate for the purpose of opening to pierce or tear the said wall or membrane so as to allow the fluid to flow out or escape from the cartridge.

For example, the puncturing or piercing elements may form part of the cartridge accepting unit and when the internal pressure in the cartridge is increased, a wall of the said cartridge deforms and becomes pierced or torn upon contact with the said puncturing elements. In another example, the puncturing or piercing elements form part of the cartridge and act on a wall or membrane of the cartridge.

Another possibility may be a closed passage in the wall or membrane which opens, becomes pierced or tears under the effect of an increase in pressure.

In all cases, the increase in pressure allows a wall or membrane of the cartridge to rupture and/or allows forced passage through the pressure-retaining means then the outflow of the drink.

Freeflow is to be understood as meaning the outflow of the drink through a cartridge comprising one or more pressure-retaining walls creating a pressure drop that has to be overcome in order to allow outflow but without there being a need to pierce and/or tear this or these walls. It may, for example, be a porous wall or a wall exhibiting a series of chicanes or sinuous passage(s) of small cross section making it possible to create a significant pressure drop that has to be overcome by increasing the pressure within the cartridge so as to cause the liquid to flow out through this wall.

Opening pressure is to be understood as meaning the value of internal pressure that allows piercing and/or tearing, by the mobilization of at least one opening means, of any known pressure-retaining means such as a wall of the cartridge for example.

Thus, as a preference, the cartridge opens, in order to allow the drink to flow out, via a wall of the cartridge which tears or becomes pierced upon contact with tearing or piercing elements when a certain fluid pressure within the cartridge is reached.

A cartridge accepting unit is to be understood as meaning at least one means for supporting the cartridge while obtaining the method as the pressure rises then the drink flows out.

A mixture of air and water is to be understood as meaning a water phase in which air is dispersed.

Froth is to be understood as meaning a layer of a dispersed system of liquid containing gas bubbles, which becomes established at the surface of a greater or lesser liquid portion of the drink particularly after it has flowed out into the container. According to one characteristic of the invention, the cartridge has a headspace smaller than the volume of air injected into the cartridge. The headspace of a cartridge is usually considered to be the dead volume not occupied by the food preparation in the chamber of the cartridge.

In a preferred embodiment, the fluid is injected by means of at least one pressurized jet within the cartridge. Upon the impact of the jet of liquid, in this instance the water or water-air mixture, air is introduced under the water level into the cartridge and contributes to the formation of froth. The jet improves the mixing phenomena which enable the air bubbles to be formed more quickly and in greater number in the cartridge. As a preference, the fluid is injected by at least one jet injected from a position off-centered in the cartridge, and preferably also, directed in a direction that does not pass through the centre of the cartridge, so as to create a swirling movement of liquid within the enclosure of the cartridge. Such a movement improves the dissolving of the food preparation in the cartridge, particularly when this preparation fills a significant volume in the cartridge, but also increases the water/air interactions that encourage the formation of the bubbles.

Surprisingly, the method of the invention is mainly suited to the improvement of the frothing of drinks obtained from a preparation that dissolves in the water during injection. In effect, the method according to the invention does not work as well with non-soluble products such as ground products, for example. In the case of products of that type, the mixing of the water and of the air tends to carry along the fines which, being non-soluble, block up the openings in the cartridges. One way of alleviating this disadvantage is to filter the ground products so as to eliminate most of the fines.

Thus, the preparation is therefore preferably soluble coffee, soluble tea, instant chocolate, powdered milk, fruit juice or a combination of these products. For example, in the case of preparations occupying a great deal of volume in the cartridge, such as powdered milk alone or mixed with other powders, for example for producing drinks such as cappuccino or the like, the cartridge may be practically filled with the said preparation from the start; and there is soon no more air available in the cartridge to form the froth.

Supplying air under pressure is therefore necessary in order to supply the cartridge with air. When water arrives in the cartridge, the air, which has a lower density than the water, tends to rise up in the cartridge, while the volume available in the cartridge increases as the preparation gradually dissolves in the water in the cartridge. The air kept under pressure before opening mixes with the water through the stirring effect created in the cartridge, and this forms the froth.

The invention also comprises a device for preparing a frothy drink from a cartridge comprising a chamber containing a preparation for a drink.

The said device comprises at least:
selection means for selecting the desired drink so as to activate a preparation cycle for preparing the said drink,
a water supply device,
an air supply means,
a fluid conveying means,
a reception unit for accepting a cartridge containing the preparation for a drink,
a fluid-injection member for injecting fluid into the cartridge in a sealed manner;
characterized in that an air storage member is provided to store a predetermined volume of air which is injected under pressure into the cartridge at each drink preparation cycle so as to create a reserve pocket of compressed air in the cartridge.

As a preference, the air storage member comprises a chamber positioned after the water conveying means. In this way, the air is essentially conveyed by the stream of pressurized water into the device. It is not necessary to provide different water and air circuits and this simplifies the device. Air can thus begin to dissolve and/or form bubbles in the water before it reaches the cartridge; this makes it possible to increase still further the volume and quality of the froth.

A selection member for selecting the desired drink is to be understood as meaning a manual or electronic control, possibly comprising a means for switching the device on, allowing the method according to the invention to be implemented, This member may also, for example, serve to choose the desired volume of drink.

This member may be any member known for this type of application and may, for example, be a manual valve and/or an electronic control panel associated with a programmer.

A water supply device is to be understood as meaning any known means for allowing the device to be supplied with water when the method according to the invention is being implemented. It is possible, for example, to envisage a reservoir or a connection to the water main.

An air supply means is to be understood as meaning any known means allowing the air storage member to be filled with a determined volume of air. Filling may simply be placing the storage member in communication with the atmosphere, in which case an opening is created and air is then introduced into the circuit to fill the storage member. Another system could be a compressor which, on demand, injects air into the storage member.

An air storage member is to be understood as meaning a chamber or cavity enabling a predetermined volume of air or of any other gas to be stored which, during implantation of the method according to the invention, will lead to the formation of froth. For example, the air storage member may be an aeration chamber.

In the method according to the invention, the volume of air stored, then injected, is a volume greater than the volume of air that could be stored in the headspace of a cartridge. Thus, it is possible to design cartridges with the smallest possible volume, and potentially to offer the possibility of delivering even larger volumes of drink. That also allows the size of the cartridges to be managed more flexibly and allows economies to be made in terms of packaging materials. Thus, the method according to the invention may form an abundant volume of froth from cartridges in which the ratio between the headspace and the volume occupied by the non-wetted preparation in the cartridge is lower than 1:3, even lower than 1:5, or even lower than 1:20 or zero. In certain cases, such as preparations based on powdered milk, the headspace may be as small as possible, or even zero, without that being disadvantageous to the formation of froth. The supply of air can also be tailored according to the air already available in the cartridge. The air injection member therefore comprises means for regulating the volume of air injected.

A water conveying means is to be understood as meaning any known means enabling a liquid to be set in motion and sufficient pressure created within the cartridge to open the cartridge and thus allow the drink to flow out. For example, this means may be a centrifugal and/or centripetal and/or positive-displacement pump.

An air and water injection member is to be understood as meaning a means allowing a fluid to be introduced in a sealed manner under pressure to the cartridge, such as by puncturing or by a related arrangement at the injection surf ace of the capsule. A preferred example of an injection member is described in co-pending European patent application No. 03019163.9 filed on 25 Aug. 2003 entitled: "Method for preparing a food product", the content of which is incorporated herein by reference. As a preference, the fluid injection member is configured to pierce the cartridge and inject the fluid in the form of at least one jet of pressurized fluid. Also as a preference, the injection member is positioned in such a way as to inject the water in the form of a pressurized jet off-centered in the cartridge. Such a position has the advantage of creating a swirling or "vortex" movement of water in the cartridge and this increases the interactions between the water and the air and therefore increases the formation of bubbles.

In a preferred mode, the device also comprises at least one opening means configured to withstand the pressure of the reserve pocket of compressed air and to open from a pressure corresponding to the pressure needed to prepare the drink and to form froth. This is because it is important to control the opening of the cartridge so as to allow the reserve of air to be created before the cartridge opens. If the cartridge were to open too soon, the air would relax out of the cartridge and would thus not be able to be used to form the froth. The opening of the cartridge needs to be regulated precisely and to take place after a sufficient quantity of water has been introduced into the cartridge to dissolve the preparation and mix with the air in order to form the froth.

In a preferred embodiment, the opening means comprises, on the one hand, a wall or membrane and, on the other hand, roughnesses or puncturing elements which, under the action of the pressure collaborate for the purpose of opening by piercing or tearing the said wall or membrane. Such a configuration provides precision in the regulating of the cartridge opening pressure and ensures that the phenomenon is nicely repeatable. Thus, in a first possible embodiment, the opening means belongs to the cartridge. In an alternative embodiment, the wall or membrane of the opening means belongs to the cartridge and the roughnesses or puncturing elements belong to the cartridge accepting unit.

A fluid is to be understood as meaning, with equal preference, air and/or water alone, or a mixture of air and water.

The pressure values mentioned in this application are absolute pressures unless indicated otherwise.

The other characteristics and advantages of the present invention will become apparent in the description which follows which represents a preferred version of the device allowing implementation of the method according to the invention.

This version described is a non-limiting example of the invention and its description will make reference to the following figures.

Additional features and advantages are described herein, and will be apparent from the following Detailed Description and the figures.

DETAILED DESCRIPTION

Figure 1:
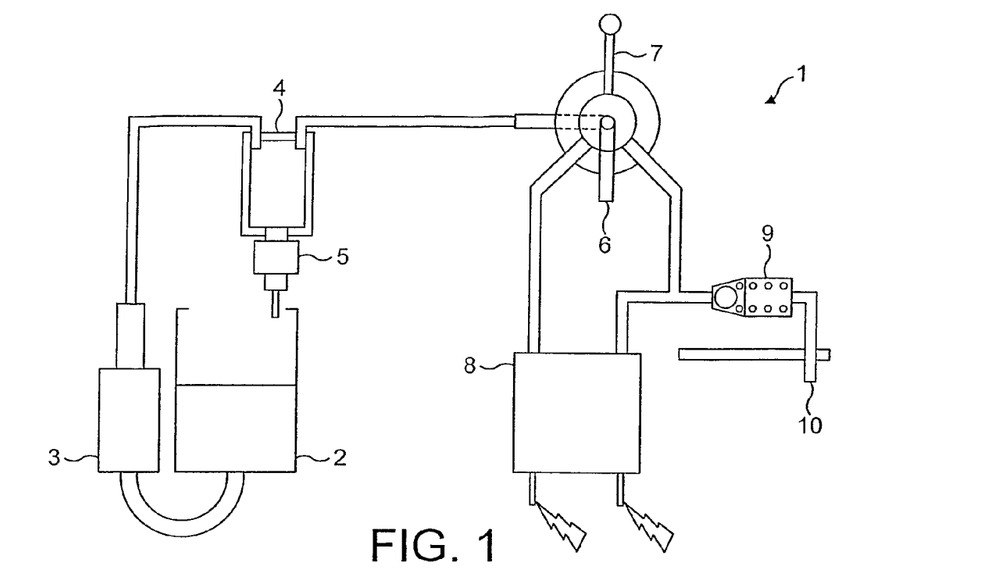
FIG. 1 shows a diagram of the device for optimizing the froth when preparing the drink, in the phase of rest.

FIG. 1 shows a general view, at rest, of the device 1 for implementing the method according to the invention comprising a water storage reservoir 2, a water conveying means 3, which, in this version, is a piston pump, which allows the fluid to be set in motion towards the air storage member which, here, is an aerator 4. The volume of the said air storage member is determined; in this invention, the said volume is at least 10 centimeters cubed, preferably at least 15 centimeters cubed, more preferably at least 20 centimeters cubed and more preferably still, at least 23 centimeters cubed. The storage member may comprise an adjustable-volume chamber so as to tailor the amount of air injected to parameters such as the headspace available in the cartridge, the amount of froth desired, the nature of the preparation, etc. For example, an adjustable system may be a moving and adjustable wall of the chamber that can be regulated manually or electrically.

In the version depicted, the air storage member is equipped with an emptying means 5, normally opened after each cycle to allow the residual water to be purged from the circuit and thereby allowing the predetermined volume of air to be re-established. This emptying device may be any known means, for example an electrically-operated valve or a flap valve. This emptying means also makes it possible to prevent water from stagnating and therefore prevent the proliferation of microorganisms. The device 1 is also equipped with an air supply 6 which consists in venting the member 4 to the atmosphere. The venting here is controlled by a manual valve 7; this valve is in a position of rest and therefore leaves the air inlet device open allowing the storage member 4 to be filled with air. When the consumer wishes to prepare the drink of his or her choice, either hot or cold, he or she has merely to operate the manual valve 7. The moving of this valve closes the venting means 6, and closes the electrically-operated valve 5 of the aerator 4. The moving of the manual valve allows the circuit of the device to be closed before the cartridge is pressurized by the device.

FIG. 1 also shows the presence of a heating member 8 which makes it possible to obtain hot drinks. The presence of this member is optional to the frothing method proper because the method according to the invention makes it possible to obtain satisfactory froth with both hot and cold drinks. By contrast, it is conceivable for the device 1 to be equipped with several heating systems if the performance of the method so demands. The heating members may be any known heating means, for example a thermoblock or an instantaneous heating system such as resistive elements or heating cartridges. Patent applications EP 1 253 844 A1 and WO 2004/006742 describe examples of heating means that can be used in this device.

The valve 7 can move into several positions; each position defining a single fluid circuit. The choice of drink, in this version, is thus obtained according to the direction in which the valve is moved into a position in which one of the circuits is open.

Figure 3:
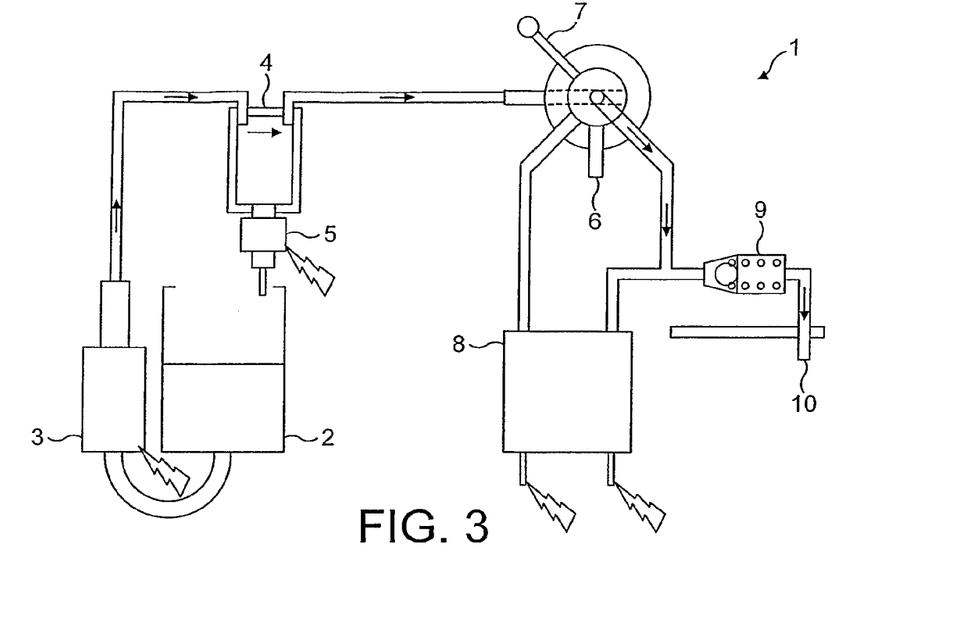
FIG. 3 shows a diagram of the device for optimizing the froth when preparing a cold drink, in the air-water mixture injection phase.
Figure 4:
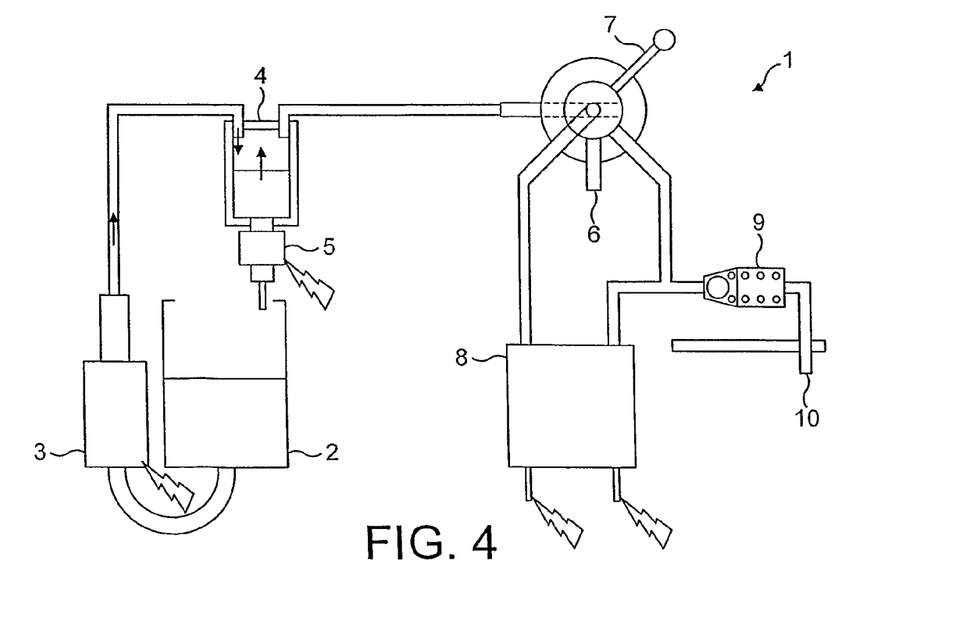
FIG. 4 shows a diagram of the device for optimizing the froth when preparing a hot drink, in the air-compression phase.

In one position shown in FIG. 4, the fluids pass through the thermoblock 8 and the drink obtained is therefore hot. In another position shown in FIGS. 2 and 3, the fluids do not follow the path to the thermoblock and the drink obtained is therefore cold.

A back-pressure valve 9 is situated just before the injection member 10, preferably between the valve 7 and the injection member 10. The back-pressure valve allows some of the air to be dissolved in the water so as to begin to form bubbles as the pressure is rising. What happens is that this valve remains closed until a minimum pressure is reached. When the fluids are circulating, the pressure against this valve increases and the air, which is the first fluid in the pipes, will first of all become compressed then mix partially with the water which is the second fluid and acts as a piston to partially drive the air. When the pressure rating of the valve 9 is reached, the said valve 9 opens to allow the air and the water-dissolved air mixture to pass, which fluids are then injected in a sealed manner with the aid of the injection member 10 into a cartridge (not depicted) which is itself connected to a cartridge accepting unit (not depicted).

When the device 1 is equipped with an electronically controlled means of selecting the desired drink, the device 1 may be equipped with a system allowing the heating member to be bypassed if the consumer desires a cold drink. This system may, for example, be a two-outlet valve situated upstream of the heating member, which opens the outlet corresponding to the type of drink selected. For example, if the consumer chooses a cold drink, the outlet proposed by the valve forces the fluid not to go to the thermoblock.

Figure 2:
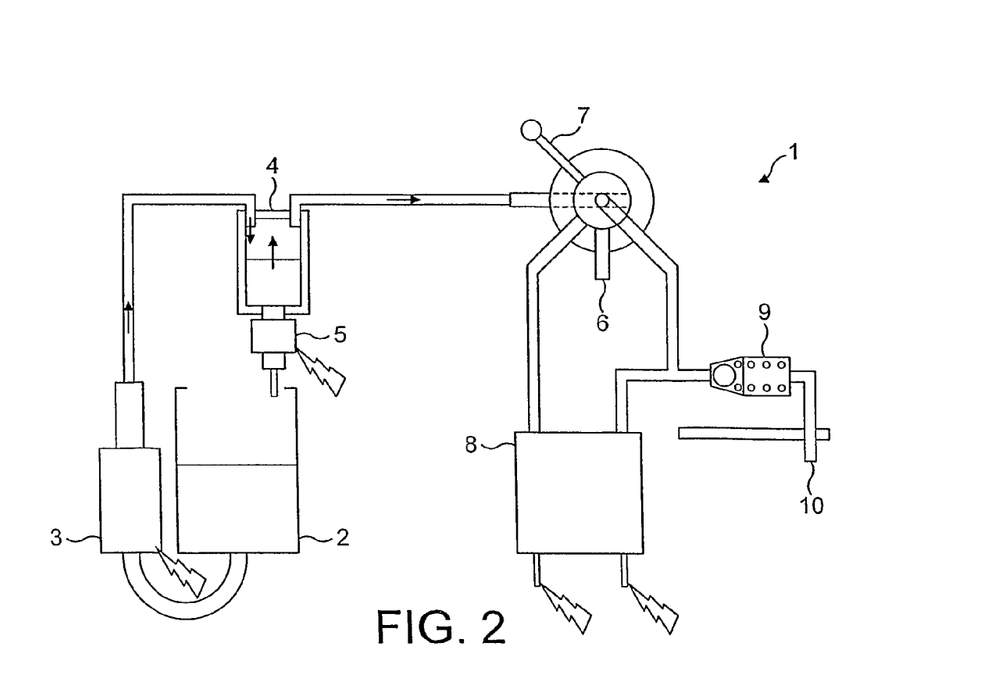
FIG. 2 shows a diagram of the device for optimizing the froth when preparing a cold drink, in the air-compression phase.

FIG. 2 shows the device for optimizing the froth when preparing a cold drink in the air-compression phase. In this case, the manual valve 7 is operated by the consumer in such a way that the only path that can be proposed for the fluids does not pass near and/or does not follow the heating circuit 8. Operation of this manual valve 7 causes the pump 3 and the aerator emptying means 5 to be switched on, the latter then moving into a closed position. The aerator together with the pipes is, at that instant, full of air because the venting device 6 and the emptying means 5 are closed, so the device 1 is then in a circuit for pressurizing the cartridge. The water contained in the reservoir 2 is then pumped into the pipes as far as the aerator 4. The water then acts as a piston to drive the air from the pipes upstream of the aerator, then it drives the air from the aerator itself in order finally to drive the air from the pipes situated downstream of the said aerator. Throughout these phases, the driven air circulates through the pipes along the only path proposed to it and therefore passes through the path which leads to the back-pressure valve 9 without going to the heating means 8. The said back-pressure valve is in a closed position and so the compressed air will accumulate at its inlet until the pressure threshold that allows it to open and allows the fluid to pass is reached.

FIG. 3 depicts the device 1 for optimizing the froth when preparing a cold drink, in the phase of injecting the air-water mixture into the cartridge. The components of the device I are all in the same position as those of FIG. 2. As described hereinabove, the water acts as a piston, driving the air from the circuit and particularly from the aerator 4. The air then travels as far as the back-pressure valve 9 and becomes compressed at the inlet thereof. The pump 3 continues to send water into the circuit, the water circulating along the only path proposed to it and thus causing an increase in the pressure in the circuit and therefore at the inlet to the back-pressure valve. The benefit of this back-pressure valve is precisely that it causes this compression of the air and causes some of the said air to dissolve in the continuous water phase.

When the pressure reaches a certain threshold value, the back-pressure valve opens and therefore allows the air, and then the water-dissolved air mixture, to pass through it. The opening pressure of this back-pressure valve is at least 1.015 bar, preferably at least 2 bar, more preferably at least 3 bar, and more preferably still, about 4 to 5 bar.

Having passed through the said back-pressure valve, the air then the water-dissolved air mixture are introduced in turn and/or simultaneously and/or partly simultaneously and/or partly successively, into the cartridge (not depicted) by means of an injection member 10, this being done in a sealed manner.

FIG. 4 shows the device 1 for optimizing the froth when preparing a hot drink in the air-compression phase. In this case, the manual valve 7 is operated by the consumer in such a way that the only path to be proposed to the fluids passes near and/or through the heating means 8. Operation of this manual valve 7 causes a switching-on of the pump 3 and of the means of emptying the aerator 5 which then switches to the closed, position. The aerator and the pipes are, at that moment, full of air because the venting device 6 and the emptying means 5 are closed, and so the device 1 is in a circuit for pressurizing the circuit.

The water contained in the reservoir 2 is then pumped to be sent into the pipes as far as the aerator 4. The water acts as a piston to drive the air from the pipes upstream of the aerator, then drives the air from the aerator itself to finally drive the air from the pipes situated downstream of the said aerator. Throughout these phases, the driven air circulates through the pipes along the only path proposed to it, and therefore passes along the path that leads to the thermoblock 8. It is then heated then continues as far as the backpressure valve 9. The said back-pressure valve is in a closed position, allowing the air to accumulate at its inlet and to become compressed.

Figure 5:
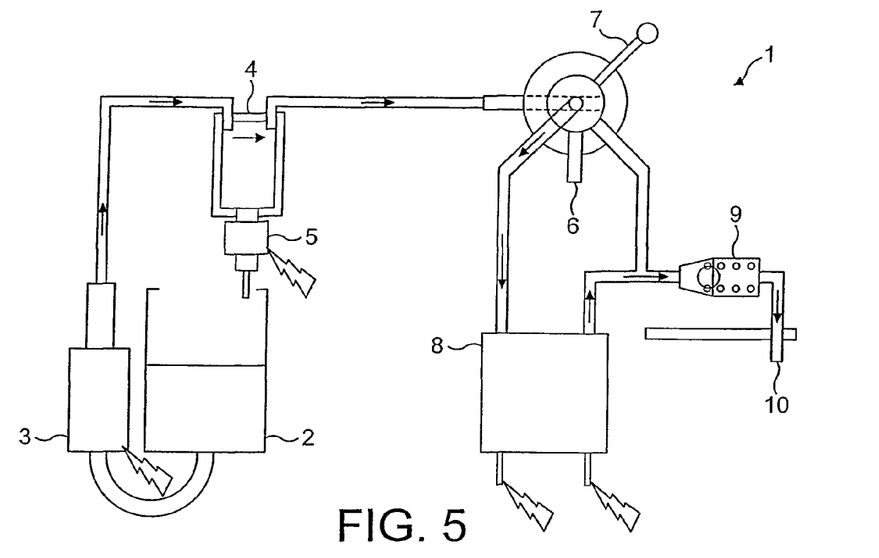
FIG. 5 shows a diagram of the device for optimizing the froth when preparing a hot drink, in the air-water mixture injection phase.

FIG. 5 depicts the device 1 for optimizing the froth when preparing the hot drink in the air-water mixture injection phase. The components of the device are all in the same position as those of FIG. 4. As described above, the water acts as a piston, driving the air from the circuit, particularly from the aerator 4. The said air then passes through the thermoblock as far as the back-pressure valve 9 and becomes compressed at the inlet thereof. The pump 3 continues to send water into the circuit. The water circulates through the only path proposed to it. It therefore passes through the thermoblock where it is heated to the desired temperature and then travels on as far as the backpressure valve, thus causing some of the air to be dissolved and the pressure in the circuit and therefore at the inlet of the back-pressure valve to increase.

When the pressure reaches a certain threshold value, the back-pressure valve opens and therefore allows the air, then the water-dissolved air mixture to pass through it. The opening pressure of this back-pressure valve is at least 1.015 bar, preferably at least 2 bar, more preferably at least 3 bar, and more preferably still, about 4 to 5 bar.

Having passed through the said back-pressure valve, the air then the water-dissolved air mixture are introduced successively and/or simultaneously and/or partly simultaneously and/or partly successively into the cartridge (not depicted) by means of an injection member 10, this being done in a sealed manner. It should be noted that, at the start of the injection cycle, a certain quantity of residual water may be injected into the cartridge before the air reaches the cartridge. This quantity may originate from water remaining in the pipes, particularly between the valve 7 and the back-pressure valve 9. Such a quantity of water has no effect on the formation of the pocket of air in the cartridge and does not in any way affect the principle of froth formation according to the invention.

Figure 6:
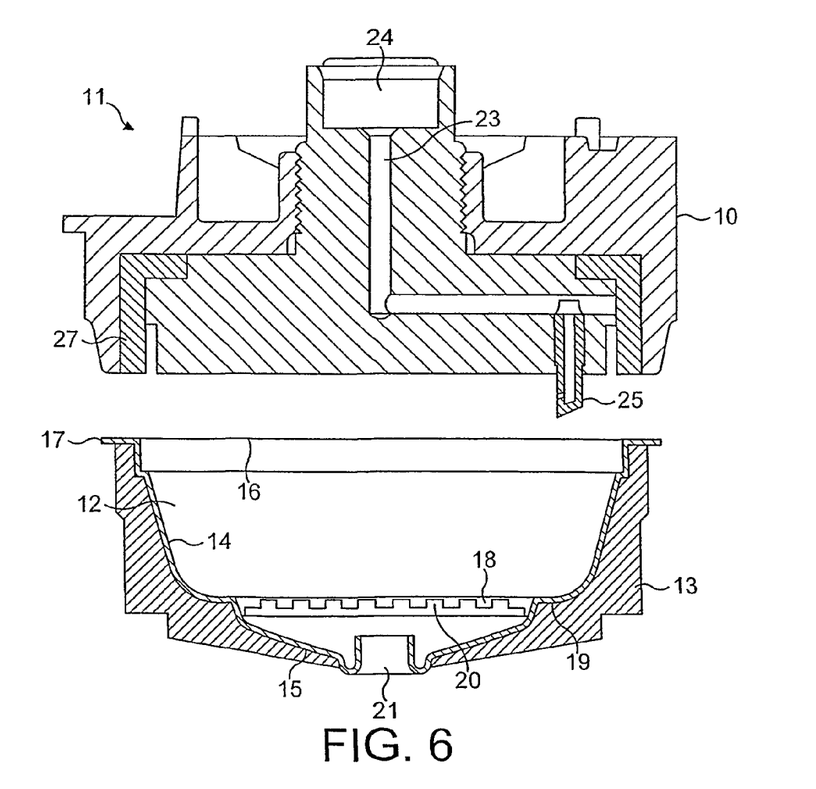
FIG. 6 is a diagrammatic view in section of one example of part of the device according to the invention comprising a cartridge accepting unit, a cartridge and a fluid injection member, this part of the device being depicted in the open position.
Figure 7:
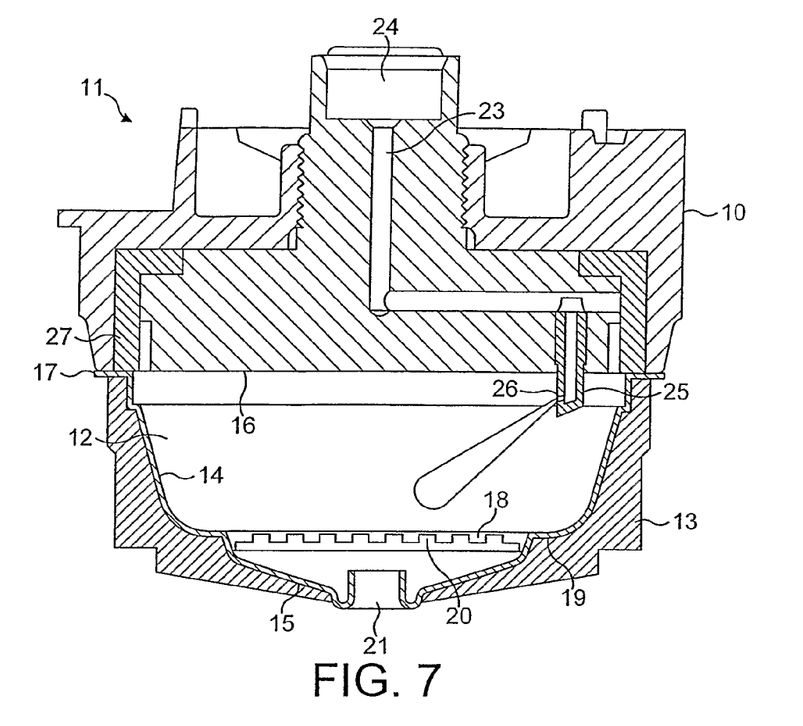
FIG. 7 is a diagrammatic view of the part of the device depicted in FIG. 6, the part of the device being depicted in the closed position.

FIGS. 6 and 7 show a schematic view in section of an example of part of the device according to the invention comprising a cartridge accepting unit, a cartridge and a fluid injection member, this part of the device being denoted by the numerical reference 11.

The cartridge 12 is kept in a position that allows the method according to the invention to be performed by virtue of a cartridge accepting unit 13. The cartridge generally adopts the shape of its support unit for greater stability. This cartridge 12, generally in the form of a cup, contains a food substance (not depicted). In this instance it is composed of a sidewall 14 and a bottom wall 15 defining a bottom, In this example, the diameter of the bottom 15 is smaller than the diameter of the opening of the cup. By way of indication, the sidewall 14 and the bottom 15 are typically made of a plastic chosen from the set comprising EVOH, PVDC, PP, PE, PA in a monolayer or a multilayer. The cartridge is also closed by a top wall 16 formed by a film sealed onto the rim 17, for example by hot melting. The said film 16 is typically made of a material capable of being punctured by puncturing and injection means of the device 11, which means are described in greater detail hereinafter.

The sidewall 14, the bottom 15 and the film 16 thus form a chamber in which the food substance is contained. Of course, the capsule may also be an open or partially open capsule. In the example depicted, it is noted that the capsule 12 comprises, in its lower part, a thin film 18 sealed onto an interior rim 19 of the cartridge and closing the chamber in its lower part. This thin film 18 is arranged above a disc 20 comprising a plurality of elements in relief, spaced uniformly at the upper surface of the disc 20 and forming a plurality of channels. The thin film 18 is intended to tear upon contact with the relief elements under the effect of the rise in pressure within the cartridge 12. It is important to note that the opening means are designed so that opening is not brought about too early on in the injection of fluid, particularly not when the air is being compressed by itself in the cartridge. This is because if the membrane ruptures at the time when the air is compressed in the cartridge, the air will escape without forming froth. It will be noted that an outflow orifice 21 is situated under this opening means so as to allow the drink to be obtained. This outflow orifice 21 is, in this instance, specific to the capsule 12 and this has the advantage that a product can be delivered directly into a mug without direct contact with the device 11 and thus ensures that there will be no cross-contamination of drinks, better hygiene, less cleaning, and greater simplicity in the actual design of the preparation device. For a more detailed description of the cartridge 12, reference will be made to Euro PCT patent application No 03/059778 A2 entitled 'Closed capsule with opening means" filed on 13 Jan. 2003 in the name of the Applicant Company and the entire content of which is incorporated herein by reference.

The device 11 comprises the fluid injection member 10 of cylindrical overall shape, arranged above the cartridge accepting unit 13. The injection member and the cartridge accepting unit are able to move vertically one with respect to the other between the open position (FIG. 6) in which the cartridge 12 can be put in place in its accepting unit 13 and the closed position (FIG. 7) in which the device 11 can be activated.

The injection member comprises, amongst other things, a fluid supply duct 23 which runs between a fluid inlet well 24 and a puncturing and injection element 25 exhibiting an injection orifice 26. The said puncturing and injection element 25 is designed to pass through the film 16 and bring the injection orifice 26 inside the cartridge 12 during the relative movement of the injection member 10 and of the cartridge accepting unit 13 which brings the device 11 into the closed position.

The well 24 is intended to be connected to a fluid supply coupling of the device 1. The said fluid arrives under pressure, and so the injection member 10 forms an assembly capable of injecting a fluid in the form of a jet from at least one injection point defined by the injection orifice 26. The number of jets is limited in order to keep the speed of the water high enough to create effective stirring. As a preference, the number of jets is less than or equal to three. As a preference, there is a single jet. If the number of jets is too high, the speed is divided and therefore too low to cause efficient stirring and therefore the correct volume of froth. Also as a preference, each jet (or the only jet) is off-centered in the cartridge so as to form a swirling movement of fluid in the cartridge. The injection member 22 further comprises a seal 27 arranged in such a way that in the closed position (FIG. 7) it presses against the rim 17 of the cartridge.

Figure 8:
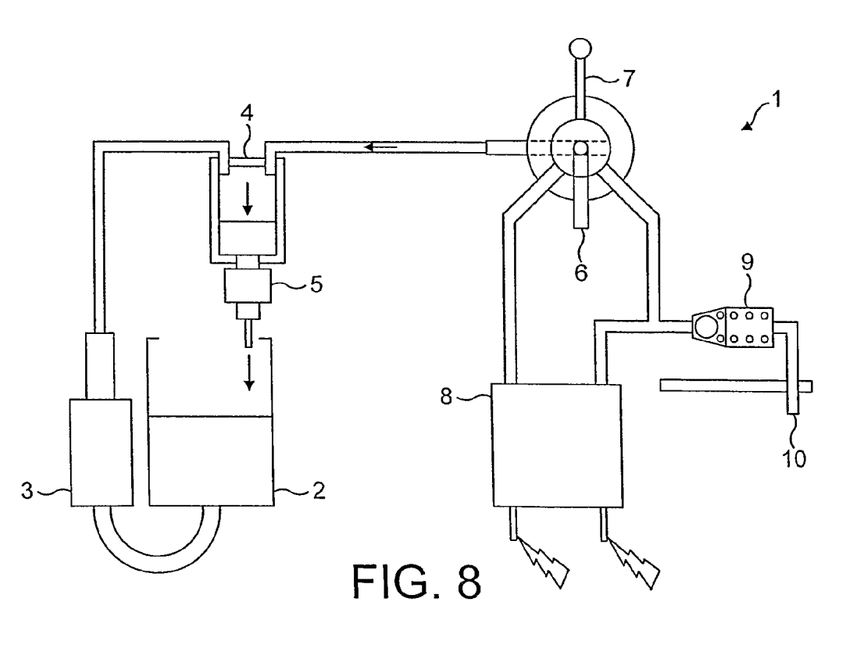
FIG. 8 shows a diagram of the device for optimizing the froth when preparing the drink in the air storage member emptying phase.

FIG. 8 depicts the device 1 for optimizing the froth when preparing a drink in the air storage member emptying phase. The manual valve 7 is then placed in a position of rest so that the air supply means 6 allows the circuit to be aerated. This position of the valve will deactivate the means 5 for emptying the air storage member 4. The said air storage member will then empty, creating a depression within the circuit. The depression causes a vacuum which is compensated for by air being let in by means of the venting member 6. This step makes it possible, on the one hand, to fill the aerator 4 with air so that the device 1 is ready to prepare another frothy drink and, on the other hand, to empty the aerator of its water.

Without this step, the said aerator would not be able to fulfill its role of air supplier and therefore of mixing. In addition, the emptying of the said aerator makes it possible to re-establish the predetermined volume of air and avoid any stagnation of water and therefore any proliferation of micro-organisms such as yeasts or bacteria, for example.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A device for preparing a frothy drink from a cartridge comprising a chamber containing a preparation for a drink the device comprising selection means for selecting the desired drink so as to activate a preparation cycle for preparing the drink comprising:
   a water supply device;
   an air supply means;
   a fluid conveying means;
   a reception unit for accepting a cartridge containing the preparation for a drink;
   a fluid-injection member for injecting fluid from the fluid-conveying means into the cartridge and configured so as to inject the fluid into the cartridge;
   an air storage member for storing a predetermined volume of air which is conveyed by the air supply means and injected under pressure into the cartridge at each drink preparation cycle so as to create a reserve pocket of compressed air in the cartridge; and
   at least one opening means configured to withstand the pressure of the reserve pocket of compressed air and to open from a higher pressure corresponding to the supply of water to the cartridge.

2. The device according to claim 1, wherein the opening means comprises a wall or membrane and roughnesses or puncturing elements which, under the action of the pressure collaborate for the purpose of opening by piercing or tearing the said wall or membrane.

3. The device according to claim 2, wherein the opening means is part of the cartridge.

4. The device according to claim 2, wherein the wall or membrane of the opening means is part of the cartridge and the roughnesses or puncturing elements is part of a cartridge accepting unit.

5. A device for preparing a frothy drink from a cartridge comprising a chamber containing a preparation for a drink the device comprising selection means for selecting the desired drink so as to activate a preparation cycle for preparing the drink comprising:
   a water supply device;
   an air supply means;
   a fluid conveying means;
   a reception unit for accepting a cartridge containing the preparation for a drink;
   a fluid-injection member for injecting fluid from the fluid-conveying means into the cartridge and configured so as to inject the fluid into the cartridge; and
   an air storage member for storing a predetermined volume of air which is conveyed by the air supply means and injected under pressure into the cartridge at each drink preparation cycle so as to create a reserve pocket of compressed air in the cartridge, wherein the air storage member comprises an aeration chamber, at least one air inlet for filling the chamber, a water inlet and a water outlet.

6. The device according to claim 5, comprising at least one emptying means for emptying the air storage member so as to prevent the water from stagnating and allow the air storage member to be filled with air.

7. A device for preparing a frothy drink from a cartridge comprising a chamber containing a preparation for a drink the device comprising selection means for selecting the desired drink so as to activate a preparation cycle for preparing the drink comprising:
   a water supply device;
   an air supply means;
   a fluid conveying means;
   a reception unit for accepting a cartridge containing the preparation for a drink;
   a fluid-injection member for injecting fluid from the fluid-conveying means into the cartridge and configured so as to inject the fluid into the cartridge;
   an air storage member for storing a predetermined volume of air which is conveyed by the air supply means and injected under pressure into the cartridge at each drink preparation cycle so as to create a reserve pocket of compressed air in the cartridge;
   at least one heating member for heating the water and making it possible to obtain hot drinks; and
   a valve means allowing the heating member to be bypassed so as to allow the consumer to choose between a hot drink and a cold one.

8. A device for preparing a frothy drink from a cartridge comprising a chamber containing a preparation for a drink the device comprising selection means for selecting the desired drink so as to activate a preparation cycle for preparing the drink comprising:
   a water supply device;
   an air supply means;
   a fluid conveying means;
   a reception unit for accepting a cartridge containing the preparation for a drink;
   a fluid-injection member for injecting fluid from the fluid-conveying means into the cartridge and configured so as to inject the fluid into the cartridge;
   an air storage member for storing a predetermined volume of air which is conveyed by the air supply means and injected under pressure into the cartridge at each drink preparation cycle so as to create a reserve pocket of compressed air in the cartridge; and
   at least one back-pressure valve allowing some of the air to be dissolved in the water before the water is injected into the cartridge.

* * * * *